(12) United States Patent
Shearer

(10) Patent No.: US 10,936,155 B1
(45) Date of Patent: *Mar. 2, 2021

(54) SYSTEMS AND METHODS FOR HOME AUTOMATION SCENE CONTROL

(71) Applicant: Vivint, Inc., Provo, UT (US)

(72) Inventor: Wade Shearer, Lehi, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,905

(22) Filed: Jul. 10, 2018

Related U.S. Application Data

(63) Continuation of application No. 14/489,249, filed on Sep. 17, 2014, now Pat. No. 10,025,463.

(60) Provisional application No. 61/879,522, filed on Sep. 18, 2013.

(51) Int. Cl.
| | |
|---|---|
| *H04L 12/28* | (2006.01) |
| *G06F 3/0482* | (2013.01) |
| *G06F 3/0488* | (2013.01) |
| *G08B 25/00* | (2006.01) |

(52) U.S. Cl.
CPC ........ *G06F 3/0482* (2013.01); *G06F 3/04886* (2013.01); *G08B 25/008* (2013.01); *H04L 12/2803* (2013.01)

(58) Field of Classification Search
CPC ............ H04L 12/2803; H04L 12/2642; G08B 25/005; G08B 13/1418; G05B 19/0428; G06F 3/0482; G06F 3/04886
See application file for complete search history.

(56) References Cited

U.S. PATENT DOCUMENTS

| | | | |
|---|---|---|---|
| 2006/0010397 A1* | 1/2006 | Laffey | G06F 3/0481 |
| | | | 715/808 |
| 2006/0019716 A1* | 1/2006 | Pell | H04L 67/24 |
| | | | 455/566 |
| 2010/0058231 A1 | 3/2010 | Duarte et al. | |
| 2010/0283579 A1 | 11/2010 | Kraus et al. | |
| 2012/0130513 A1 | 5/2012 | Hao et al. | |
| 2014/0304646 A1 | 10/2014 | Rossmann | |

* cited by examiner

*Primary Examiner* — Rinna Yi
(74) *Attorney, Agent, or Firm* — Holland & Hart, LLP

(57) ABSTRACT

Methods and systems are described for providing a graphical user interface suitable for viewing and modifying home automation, home security, and/or energy management devices. In some embodiments, the graphical user interface may include a scene selection list displaying multiple selectable items representing various scenes. In certain instances, control and monitoring of one or more devices may at least be accessed through a transitory user interface element such as, for example, a drawer control, a pullable view, or the like. Multiple device states may be set in accordance with a scene definition associated with a selectable list item in a scene selection list displayed in the transitory user interface element. The contents of the scene selection, in certain embodiments, may be determined in part based on a detected application context, user context, or both.

12 Claims, 14 Drawing Sheets

SYSTEMS AND METHODS FOR HOME AUTOMATION SCENE CONTROL

CROSS REFERENCE

This application is a continuation of U.S. patent application Ser. No. 14/489,249 entitled "Systems and Methods for Home Automation Scene Control," filed Sep. 17, 2014, which claims priority from U.S. Provisional Patent Application No. 61/879,522 entitled "Systems and Methods for Home Automation Scene Control," filed Sep. 18, 2013, both of which are incorporated herein in their entirety by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. Convenient and rapid access to user interface controls for setting system parameters related to installed automation, energy management, and/or security systems may not be readily available.

SUMMARY

Methods and systems are described for providing a graphical user interface suitable for viewing and modifying home automation, home security, and energy management devices. In some embodiments, the graphical user interface may include a scene selection list displaying multiple selectable items representing various scenes. Scenes may include, for example, standard scenes that are, at least in part, pre-configured at or before the time of system installation, and/or custom scenes, which may be added to the set of available scenes after system installation. Selection of a scene may activate the scene such that associated device settings may be set in accordance with the scene definition. Associated devices and systems may include, for example, home automation devices, security systems, or energy management devices. In some instances, the contents of the list may be configurable. The list of selectable items may include, for example, one or more scenes associated with a detected context. Scene-based device control, simplified scene creation and management, or both, may provide a more robust and flexible control model, enabling executing of control and management functions at a higher grouping level.

In certain instances, control and monitoring of one or more devices may at least be accessed through a transitory user interface element such as, for example, a drawer control, a pullable view, and/or the like. Multiple device states may be set in accordance with a scene definition associated with a selectable list item in a scene selection list displayed in the transitory user interface element. The contents of the scene selection, in certain embodiments, may be determined, in part, based on a detected application context, user context, or both. In some implementations, a summary list of system states, device states, or both may be available coincident with the presentation and/or availability of the transitory user interface element via a control such as, for example, a pullable view and/or a drawer control. In addition, a scene detail view may be directly accessible from the transitory user interface element. An exemplary implementation may include a portable electronic device with a touch screen display. A security activation state indicator may also be displayed coincident with the transitory user interface element or within the transitory user interface element container. In some embodiments, the scene selection list is available from any application state, which may allow for a more efficient navigation model on small screen devices, such as mobile devices. It may have the further advantage of increasing screen area by populating widely accessible transitory user interface elements with contextually related content and or controls.

In some embodiments, a computer generated graphical user interface of the home automation scene control system may include a scene selection list of selectable items representing scenes displayed in one or more transitory user interface elements. Selection of one or more of the selectable items may activate the scene associated with the selection. One or more property automation device settings may be associated with one or more of the selectable items. In some instances, one or more security system device settings may be associated with one or more of the selectable items. In some embodiments, one or more of the selectable scenes may be associated with an energy management device setting. In certain implementations, the graphical user interface may be produced on a portable electronic computing device having a touch screen display.

In some implementations, the transitory user interface element may be a drawer control. In some instances, a pullable view control displaying a summary list may be accessible from the transitory user interface element. A scene summary view may also be directly accessible from the transitory user interface element. In certain implementations, the list of selectable items may be based, at least in part, on a configurable list of context associations. One or more selectable items may be included in the list of selectable items based, at least in part, on the current application context and/or the location of the user. In some embodiments, selectable scene items may be associated with multiple types and/or categories of scenes. In certain cases, at least one selectable scene item is associated with a standard scene, and at least one selectable scene item is associated with a custom scene.

In some embodiments, a computer generated graphical user interface of the home automation scene control system may include a scene selection list of selectable items representing scenes, at least a portion of which may be displayed within the area defined by the transitory user interface element. A security activation state indicator may be displayed coincident with the transitory user interface element. Selection of one or more of the selectable items may activate the scene represented by the selection. One or more property automation device settings may be associated with one or more of the selectable items. In some implementations, the transitory user interface element may be a drawer control. In certain implementations, the graphical user interface may be produced on a portable electronic computing device having a touch screen display. In some embodiments, selectable scene items may be associated with multiple types and/or categories of scenes. In certain cases, at least one selectable scene item is associated with a standard scene, and at least one selectable scene item is associated with a custom scene.

Some embodiments include a method of displaying items associated with one or more scenes. A current context may be determined and a pre-defined list of context-associated scenes may be retrieved based, at least in part, on the current context. If the method determines that the current context corresponds to one or more of the context-associated scenes in a pre-defined list, a list of scenes may be generated and displayed based, at least in part, on the results of that determination. In some instances, the list of scenes may be displayed in a transitory user interface element. In some implementations, the transitory user interface element may be a drawer control. In other instances, the transitory user interface element may be implemented as a pullable view control. In certain embodiments, the list of scenes may include one or more selectable items configured to activate a scene represented by the selectable item. One or more property automation device settings may be associated with one or more of the selectable items, and one or more security system device settings may be associated with one or more of the selectable items.

Some embodiments include a method controlling one or more scene activation states. The system may detect the occurrence of an event that may trigger the display of a transitory user interface element. A list of scenes may be requested from a data store by, for example, an engine on a remote management device, through a data store interface. The list of scenes may be received by, for example, an engine on the remote management device, and a user selection of a selectable item in the transitory user interface element may then be received. Activation of the scene associated with the selected item may be requested.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
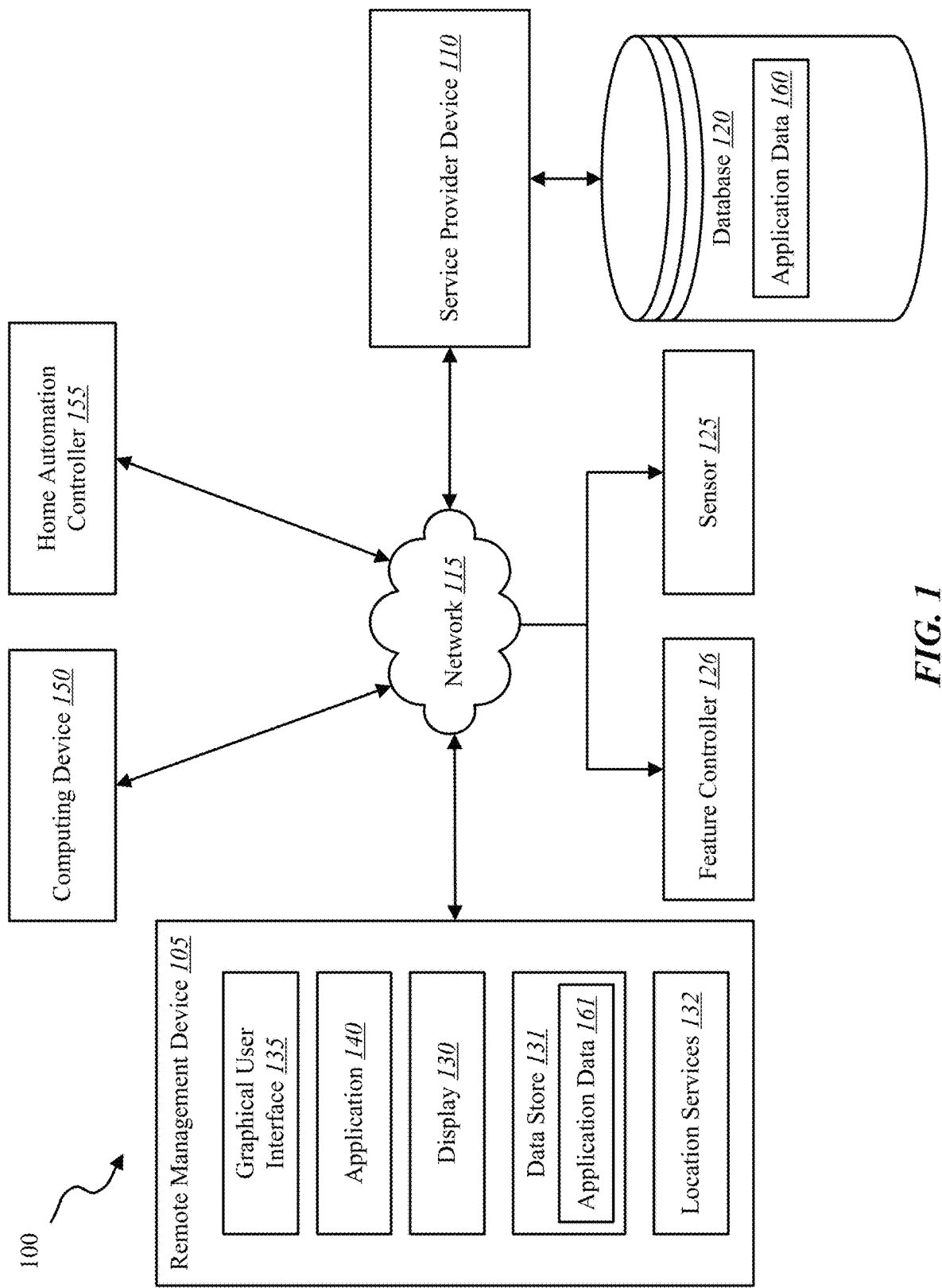
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described here may relate to home automation and home security. More specifically, the systems and methods described may relate to an improved graphical user interface for integrated monitoring and managing of home automation systems and home security systems.

FIG. 1 is a block diagram illustrating one embodiment of an environment 100 in which the present systems and methods may be implemented. In some embodiments, the systems and methods described herein may be performed on a device (e.g., remote management device 105). The environment 100 may include a remote management device 105, a service provider device 110, a sensor 125, a feature controller 126, a display 130, a computing device 150, a home automation controller 155, and/or a network 115 that allows the remote management device 105, service provider device 110, computing device 150, home automation controller 155, sensor 125, and feature controller 126 to communicate with one another. Examples of remote management device 105 include control panels, indicator panels, multi-site dashboards, mobile devices, smart phones, personal computing devices, computers, servers, etc. Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like.

In some embodiments, the remote management device 105 is a portable electronic device with a touch screen display. The width of the portable electronic device may range from about 60 mm to 195 mm, the height may range from about 110 mm to 275 mm, and/or the weight may range from about 100 g to 2000 g.

In some embodiments, remote management device 105 may be integrated with home automation controller 155 in the form of one or more personal computing devices (e.g., mobile devices, smart phones, and/or personal computing devices) to both control aspects of a property as well as to receive and display notifications regarding monitored activity of a property. Examples of sensor 125 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

Sensor 125 may represent one or more separate sensors or a combination of two or more sensors in a single sensor device. For example, sensor 125 may represent one or more camera sensors and one or more motion sensors connected to environment 100. Additionally, or alternatively, sensor 125 may represent a combination sensor such as both a camera sensor and a motion sensor integrated in the same sensor device. Although sensor 125 is depicted as connecting to remote management device 105 over network 115, in some embodiments, sensor 125 may connect directly to remote management device 105. Additionally, or alternatively, sensor 125 may be integrated with a home appliance or fixture such as a light bulb fixture. Sensor 125 may include an accelerometer to enable sensor 125 to detect a movement. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125. Sensor 125 may include a proximity sensor to enable sensor to detect proximity of a person relative to a predetermined distance from a dwelling (e.g., geo-fencing). Sensor 125 may include one or more security detection sensors such as, for example, a glass break sensor, a motion detection sensor, or both. Additionally, or alternatively, sensor 125 may include a smoke detection sensor, a carbon monoxide sensor, or both.

Feature controller 126 may represent one or more separate feature controls or a combination of two or more feature controls in a single feature controller device. For example, feature controller 126 may represent one or more camera controls and one or more door lock controls connected to environment 100. Additionally, or alternatively, feature controller 126 may represent a combination feature controller such as both a camera control and a door lock control integrated in the same feature controller device. Although feature controller 126 is depicted as connecting to remote management device 105 over network 115, in some embodiments, feature controller 126 may connect directly to remote management device 105. Additionally, or alternatively, feature controller 126 may be integrated with a home appliance or fixture such as a light bulb fixture. Feature controller 126 may include a lighting control mechanism configured to control a lighting fixture. Feature controller 126 may include a wireless communication device enabling feature controller 126 to send and receive data and/or information to and from one or more devices in environment 100. Additionally, or alternatively, feature controller 126 may include an appliance control interface enabling feature controller 126 to send commands to an integrated appliance interface. Feature controller 126 may include an interface to a security system to monitor, activate, modify and/or arm one or more security features.

In some configurations, remote management device 105 may include components such as graphical user interface 135, application 140, display 130, data store 131, and location services 132. Although the components of remote management device 105 are depicted as being internal to remote management device 105, it is understood that one or more of the components may be external to the remote management device 105 and connect to remote management device 105 through wired and/or wireless connections. For example, one or more components (e.g., software, firmware, and/or hardware) of application 140 may be located, installed, and/or part of home automation controller 155, computing device 150, service provider device 110, sensor 125, feature controller 126, and/or database 120.

In some embodiments, computing device 150 may include a television set. Additionally, or alternatively, computing device 150 may include one or more processors, one or more memory devices, and/or a storage device. Examples of computing device 150 may include a viewing device associated with a media content set top box, satellite set top box, cable set top box, DVRs, personal video recorders (PVRs), and/or mobile computing devices, smart phones, personal computing devices, computers, servers, etc. Thus, application 140 may be installed on computing device 150 in order to allow a user to interface with a function of remote management device 105, home automation controller 155, and/or service provider device 110.

In some embodiments, remote management device 105 may communicate with service provider device 110 via network 115. Examples of networks 115 include cloud networks, local area networks (LAN), wide area networks (WAN), virtual private networks (VPN), wireless networks (using 802.11, for example), and/or cellular networks (using 3G and/or LTE, for example), etc. In some configurations, the network 115 may include the Internet. In some embodiments, a user may access the functions of remote management device 105 and/or home automation controller 155 from computing device 150. For example, in some embodiments, computing device 150 includes a mobile application that interfaces with one or more functions of remote management device 105, home automation controller 155, and/or service provider device 110.

In some embodiments, service provider device 110 may be coupled to database 120. Database 120 may include application data 160 associated with the monitored activities of a property. For example, remote management device 105 may access application data 160 in database 120 over network 115 via service provider device 110. Database 120 may be internal or external to the service provider device 110. In one example, remote management device 105 may include an integrated data store 131, being internal or external to remote management device 105. Data store 131 may include application data 161 associated with the monitoring activities of a property. In some embodiments, application data 161 includes one or more replicated application data 160 items. In certain instances, one or more application data 161 items are synchronized with one or more application data 160 items.

Application 140 may allow a user to control (either directly or via home automation controller 155) an aspect of the monitored property, including security, energy management, locking or unlocking a door, checking the status of a door, locating a person or item, controlling lighting, thermostat, cameras, receiving notification regarding a current status or anomaly associated with a home, office, place of business, and the like. In some configurations, application 140 may enable remote management device 105 to interface with home automation controller 155 and provide a graphical user interface 135 to display automation, security, and/or energy management content on remote management device 105 and/or computing device 150. Thus, application 140, via the graphical user interface 135, may allow users to control aspects of their home, office, and/or other type of property.

Figure 2:
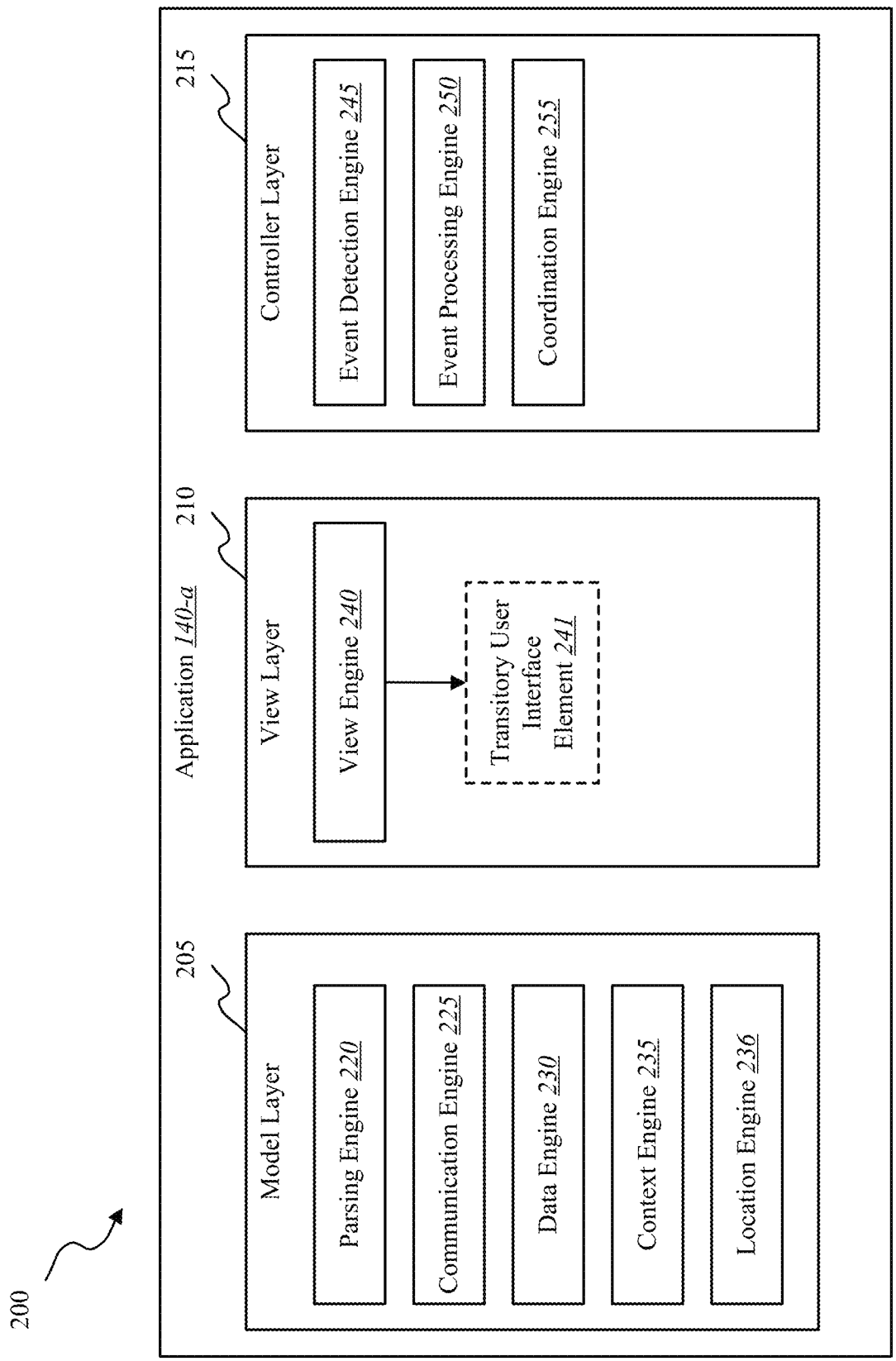
FIG. 2 is a block diagram of one example of an application layer architecture of the application of FIG. 1.

Referring now to FIG. 2, in some embodiments, application 140 may be implemented according to a block diagram 200 of application 140-*a*. Application 140-*a* may be one example of application 140 depicted in FIG. 1. Application 140-*a* may include a model layer 205, a view layer 210, and a controller layer 215. The model layer 205 may include a parsing engine 220, a communication engine 225, 5 a data engine 230, a context engine 235, and a location engine 236. The view layer 210 may include a view engine 240 configured to generate transitory user interface elements 241. The controller layer 215 may include an event detection engine 245, an event processing engine 250, and/or a coordination engine 255. These engines may be implemented as objects, modules, routines, services, distributed services, web services, or any other programming model capable of implementing the systems and methods described herein.

The communication engine 225 may be configured to communicate with other computing devices, including sending commands, sending data, and/or receiving data. Computing devices may include, for example, home automation controller 155, computing device 150, service provider device 110, sensor 125, and/or feature controller 126. In one example, communication engine 225 may send a request to a home automation controller 155 requesting home automation controller 155 to send device state data. In an alternate embodiment, the communication engine 225 may implement a listener service to receive broadcast data and/or streamed data. The communication engine 225 may pass data directly to other engines or services. In addition, or alternatively, the communication engine 225 may create data structures, such as, for example, by instantiating objects, queuing data structures for retrieval by other engines, notifying other engines of data structures of interest, and/or passing data structures directly to other engines. For example, the communication engine 225 may detect and receive a broadcast message from a service provider device 110 indicating that a glass break sensor has detected a glass break event. The communication engine 225 may instantiate a device state object that includes the received data relating to the event, and place the device state object in a queue for retrieval by the parsing engine 220.

Parsing engine 220 may be configured to process device state data received from sensor 125, feature controller 126, service provider device 110, home automation controller 155, database 120, and/or data store 131. In some embodiments, this data is received via communication engine 225, data engine 230, or both. For example, parsing engine 220 may request one or more scene configurations from a data engine 230. In some implementations, a scene is a designation of one or more devices and or systems and a set of states for one or more of the devices and/or systems. In addition, in some instances, a scene includes one or more methods for setting the one or more device and/or system states in accordance with the scene definition. A scene may also include and/or be associated with one or more automation rules, triggers, and/or contexts. Data engine 230 may retrieve one or more scene configurations from data store 131 and provide data to parsing engine 220. The parsing engine 220 may provide a summary scene list object to the coordination engine 255 for delivery to the view engine for population of a presentation view.

In some embodiments, a context engine determines application context, user context, or both. Application contexts may include, for example, a default context, a scene context, a person-of-interest context, and/or a functional context. User contexts may include, for example, a user location such as at home and away from home. In certain implementation, the location engine 236 may send location information, such as, for example, global position system coordinates to the context engine 235. The context engine 235 may then compare the received coordinates with configured coordinates of interest to determine if the received coordinates are within configured distance from coordinates of interest, thus indicating a user location context. If available, the context engine 235 may further receive speed and direction data from the location engine 236. Alternatively, the context engine 235 may determine speed and direction based on an algorithm that accounts for multiple received coordinate sets over time.

Contexts may be used to control display of certain items, availability of certain functions, and/or execution of certain rules. In some implementations, a context configuration may be created identifying one or more scenes to be displayed in a summary list of scenes when the context engine 235 detects the associated context. Further, a context configuration may be created identifying one or more scenes of interest to be displayed in a scene list when the context engine 235 detects that associated context. Context configurations may be stored in a persistent data store integrated with the remote management device 105 or a remote data store such as, for example, database 120. For example, when a user location context is detected indicating the user is away from the home, a device type status for the state of some or all door locks may be configured to be displayed in a summary list of device states. By contrast, when a user context is detected indicating the user is at home, a device type status for the state of some or all door locks may not be of interest and thus not included in the configuration for the at home context.

In some embodiments, location engine 236 may monitor the location of a user and/or object, and provide location-related information to other processes. Location-related information may include information relating to, for example, GPS coordinates, wireless triangulation data, signal intensity data, pre-defined location data, directional data, distance data, rate of travel data, historical location data, and the like. The location engine 236 may make this information available, for example, upon request through an exposed call interface, through access to a data store, or through data broadcasting. The context engine 235 may obtain location information from the location engine 236 and compare the information to location parameters associated with user location contexts. For example, the location engine 236 may provide GPS coordinates, direction data and rate of travel data to the context engine 235. The context engine 235 may then determine the distance from home if the user is moving towards home, and the time until the user will arrive home. The result of this determination may be compared to a configured context relating to whether a user is within a certain time threshold of arriving home. One or more scenes may be associated with this context, for example, a scene for activating certain devices when the user is within 15 minutes of arriving home. This scene may then be provided to the user in a list of selectable scenes generated by the view engine.

In certain instances, event detection engine 245 and event processing engine 250 recognize user interface events and initiate methods associated with those events. For example, when a save event is pressed after editing a context configuration, the event detection engine 245 detects the button press event and calls the event processing engine 250 to initiate the appropriate processing activities, such as directing the coordination engine 255 to pass information to the data engine 230 for persistent storage, and/or directing the view engine 240 to generate the appropriate presentation view according to the navigation path.

Figure 3:
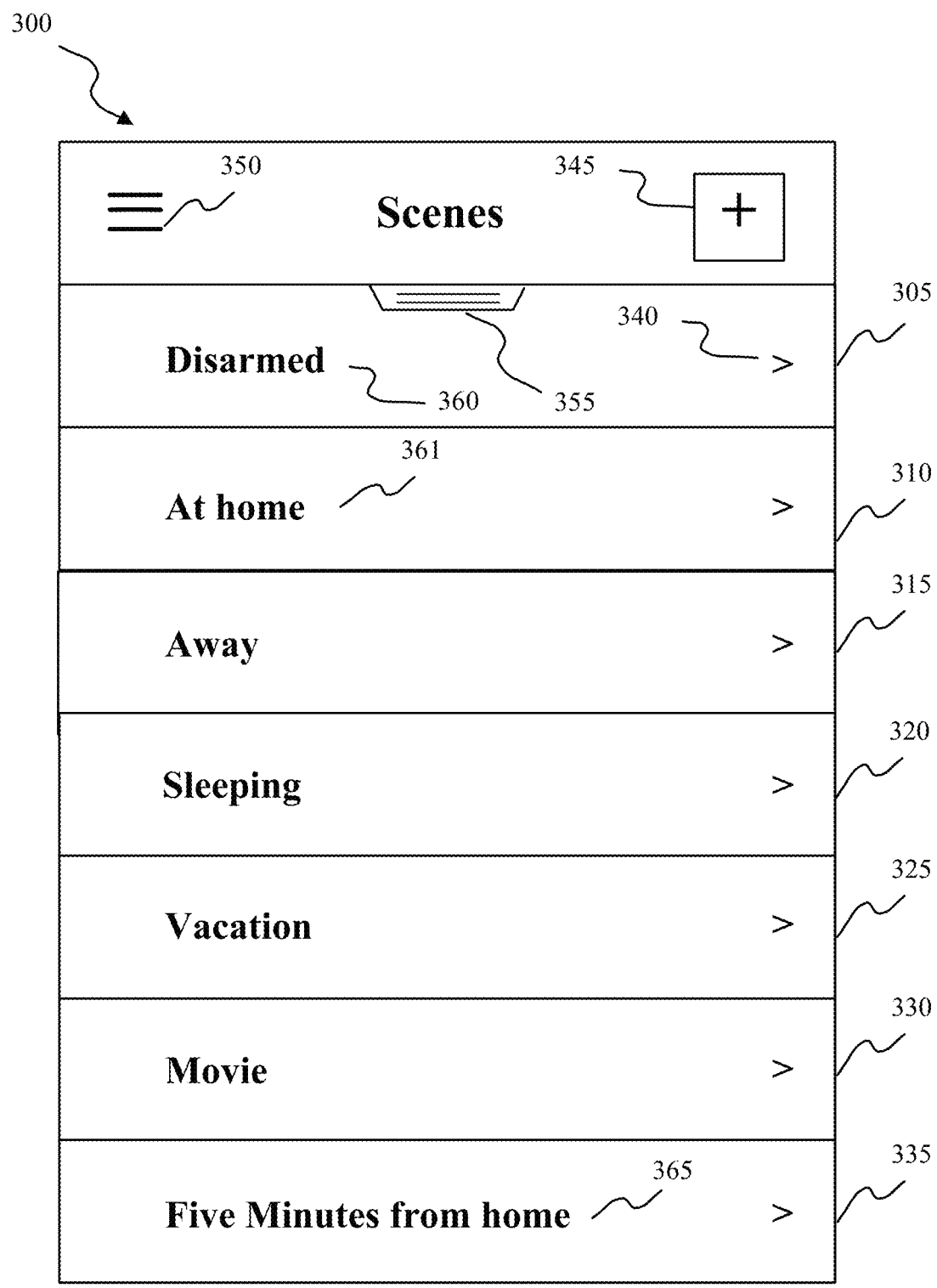
FIG. 3 is a block diagram of an exemplary user interface for a home automation and security system scene listing view displayed on a remote management device of FIG. 1.

Referring now to FIG. 3, an exemplary user interface for displaying a list of device scenes 300 may be generated by the view engine 240 (see FIG. 2). Each scene list item 305, 310, 315, 320, 325, 330, 335 may be displayed as an active control indicated, for example, by a graphical indicator such as an arrow 340. Detection of a selection event for an active control by the event detection engine 245 may result in the event processing engine 250 generating a view with information or functionality relating to the scene list item. Such information and/or functionality may include, for example, security system states, device states, device feature controls, energy management feature controls, and the like. Scene list item categories may include, for example, dynamic system state indicators 360, non-editable standard scene indicators 361, and/or custom editable scene indicators 365. Selecting the add scene control 345 may trigger an editable add scene view (not shown) for the creation and configuration of custom scenes. Selection of the hamburger menu item may trigger the display of a transitory user interface element, such as the set scene view 805 of FIG. 8. A pullable view element may be provided and include a pull indicator 355. Dragging from the top edge of a main window and/or a pull indicator may display a pullable view, such as the scene summary pullable view 905-a of FIG. 9.

Figure 4:
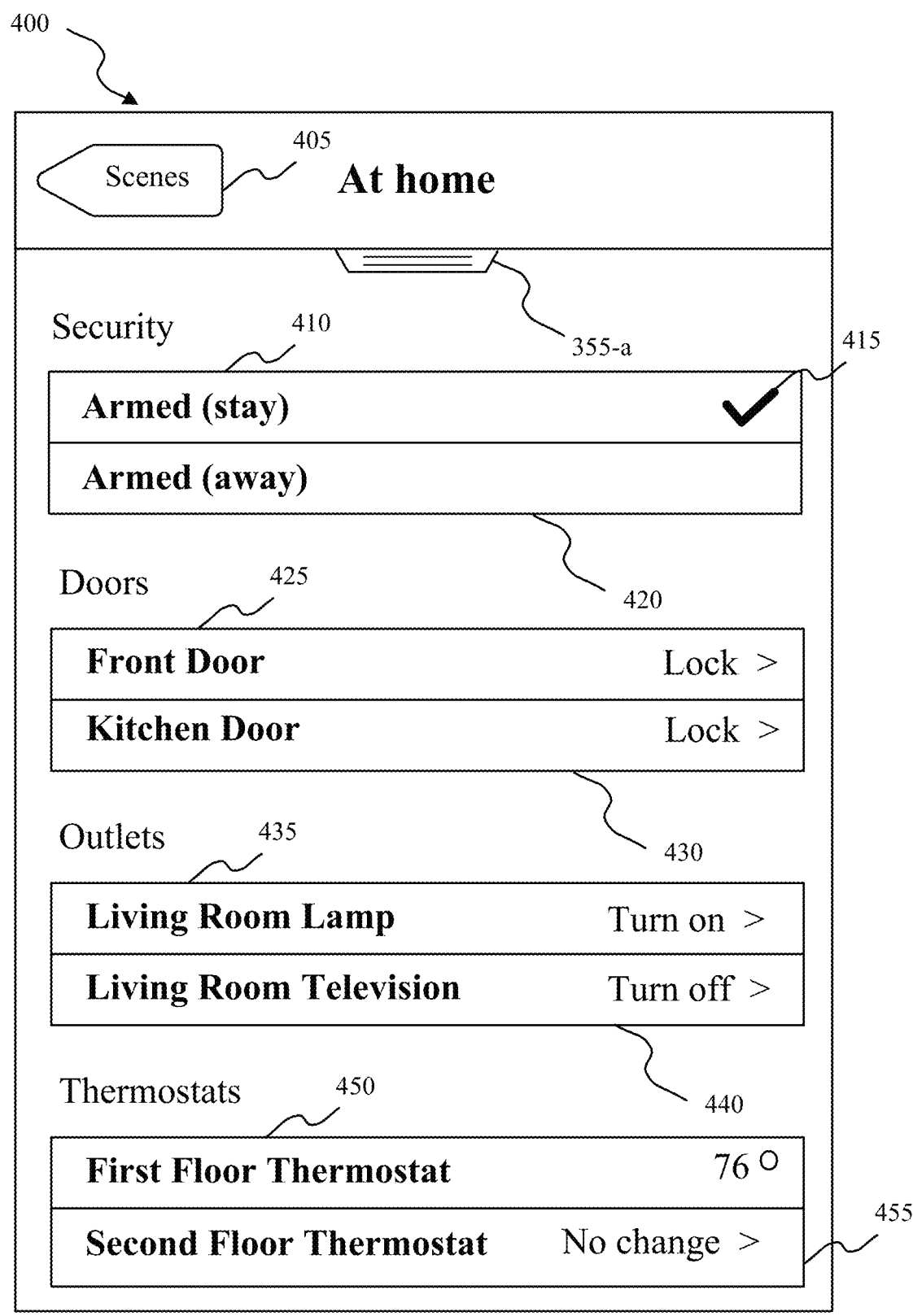
FIG. 4 is a block diagram of an exemplary user interface for a detailed scene view of a standard scene listed on the scene listing view of FIG. 3.

In some implementations, selecting a scene list item 305, 310, 315, 320, 325, 330, 335 may trigger display of the associated detailed scene view. Referring now to FIG. 4, an exemplary user interface for displaying a detailed scene view for an example standard scene may be generated by the view engine 240. In certain cases, the detailed standard scene view may be the end of a navigation path, and include a back navigation button 405 that when selected, triggers the generation of the device scenes 300 in a list view (see FIG. 3). The detailed scene view may display a list of system states and/or device items associated with the scene, along with the configured state for each system and/or device. In this example, a standard At home detailed scene view 400 is shown. In this example configuration, the At home scene includes two possible selectable security states, namely a selectable Armed (stay) state 410 and a selectable Armed (away) state 420. The At home scene is configured to set the security system to Armed (stay) when the At home scene is activated, which is indicated with a check mark 415. Selection of the selectable Armed (away) state list item changes the configuration to set the security state to Armed (away) when the At home scene is activated. A pullable view element may be provided and include a pull indicator 355-a.

In addition to system states, some instances may include detailed scene views associated with automation device items and energy management device items. Still referring to FIG. 4, door associated devices, outlet associated devices, and/or thermostat associated devices, for example, may be configured in a detailed scene view. In this example, the selectable front door device item 425 and the selectable kitchen door device item 430 are each associated with their respective door lock feature controls. The At home scene is configured to lock the front door and the kitchen door when the At home scene is activated, in certain cases, by sending a command to the associated feature control. In some instances, selection of the selectable front door device control 425 triggers display of a set device configuration view (not shown) for setting the desired lock state to be triggered when the At home scene is activated. Display of a similar view may be triggered when selection of the selectable kitchen door device control 430 is detected.

The on and off state of devices such as fixtures, appliances, and the like may be controlled by toggling the power state of the outlet supplying power to the device. In this example, a living room lamp and a living room television are each powered by outlets associated outlet feature controls. The At home scene is configured to toggle the power state to on for both outlets when the At home scene is activated, in certain cases, by sending a command to the associated feature controls. In certain embodiments, this command is a z-wave command. In some instances, selection of the selectable Living Room Lamp outlet item 435 triggers display of a set outlet configuration view (not shown) for setting the desired power state to be triggered when the At home scene is activated. Display of a similar view may be triggered when selection of the selectable Living Room Television outlet item 440 is detected.

The settings for energy management devices such as thermostats and the like may be configured in a detailed scene view as well. In this example, the selectable First Floor Thermostat device item 450 and the selectable Second Floor Thermostat device item 455 are each associated with their respective thermostat feature controls. The At home scene is configured to set the first floor thermostat to 76° when the At home scene is activated, in certain cases, by sending a command to the associated thermostat feature control, while the configuration for the second floor thermostat is set to leave the temperature unchanged. In some instances, selection of the selectable First Floor Thermostat item 450 triggers display of a set thermostat device configuration view (not shown) for setting the desired temperature setting, if any, to be triggered when the At home scene is activated. Display of a similar view may be triggered when selection of the selectable Second Floor Thermostat item 455 is detected.

Figure 5:
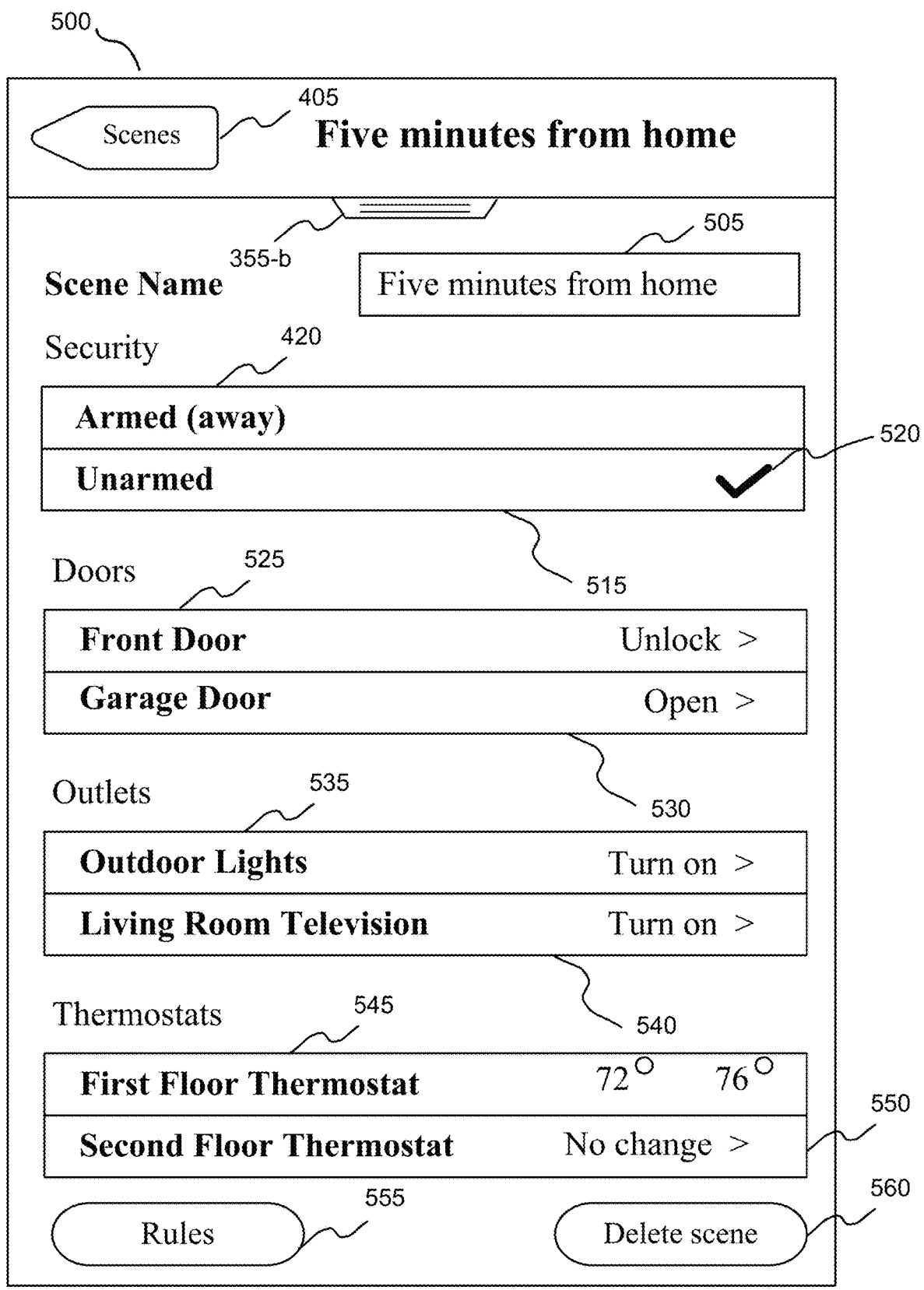
FIG. 5 is a block diagram of an exemplary user interface for a detailed scene view of a custom scene listed on the scene listing view of FIG. 3.

Referring now to FIG. 5, an exemplary user interface for displaying a detailed custom scene view may be generated by the view engine 240. In some embodiments, a detailed custom scene view may provide an editable scene designator 505 used to identify the scene in, for example, other user interface views. In this example, an editable custom detailed scene view 500 displays a custom scene created through, for example, an editable add scene view (not shown). A custom scene may be associated with one or more contexts, such as a user location context. In this example, the detailed custom scene view displays custom scene with systems and devices configured for desired states and associated with a user location context indicating the user is within 5 minutes of arriving home. The Five minutes from home scene includes two possible selectable security state items, namely a selectable Armed (away) state list item 420-*a* and a selectable Unarmed state list item 515. The Five minutes from home scene is configured to set the security system to Unarmed when the Five minutes from home scene is activated, which is indicated with, for example, a check mark 520. Additional selectable list items 525, 530, 535, 540, 545, 550, may be operationally similar to the selectable list items for the detailed standard scene view of FIG. 4. Additional buttons may be generated by the view engine, including, for example, a Rules button 555 and a Delete scene button 560. The Rules button 555 may trigger the display of a rules configuration interface (not shown) for creating and/or editing rules associated with the custom scene. The Delete scene button may delete the scene directly and/or optionally display a prompt (not shown) requesting confirmation of intent to delete the scene, which confirmation results in a scene deletion event. A pullable view element may be provided and include a pull indicator 355-*b*.

Figure 6:
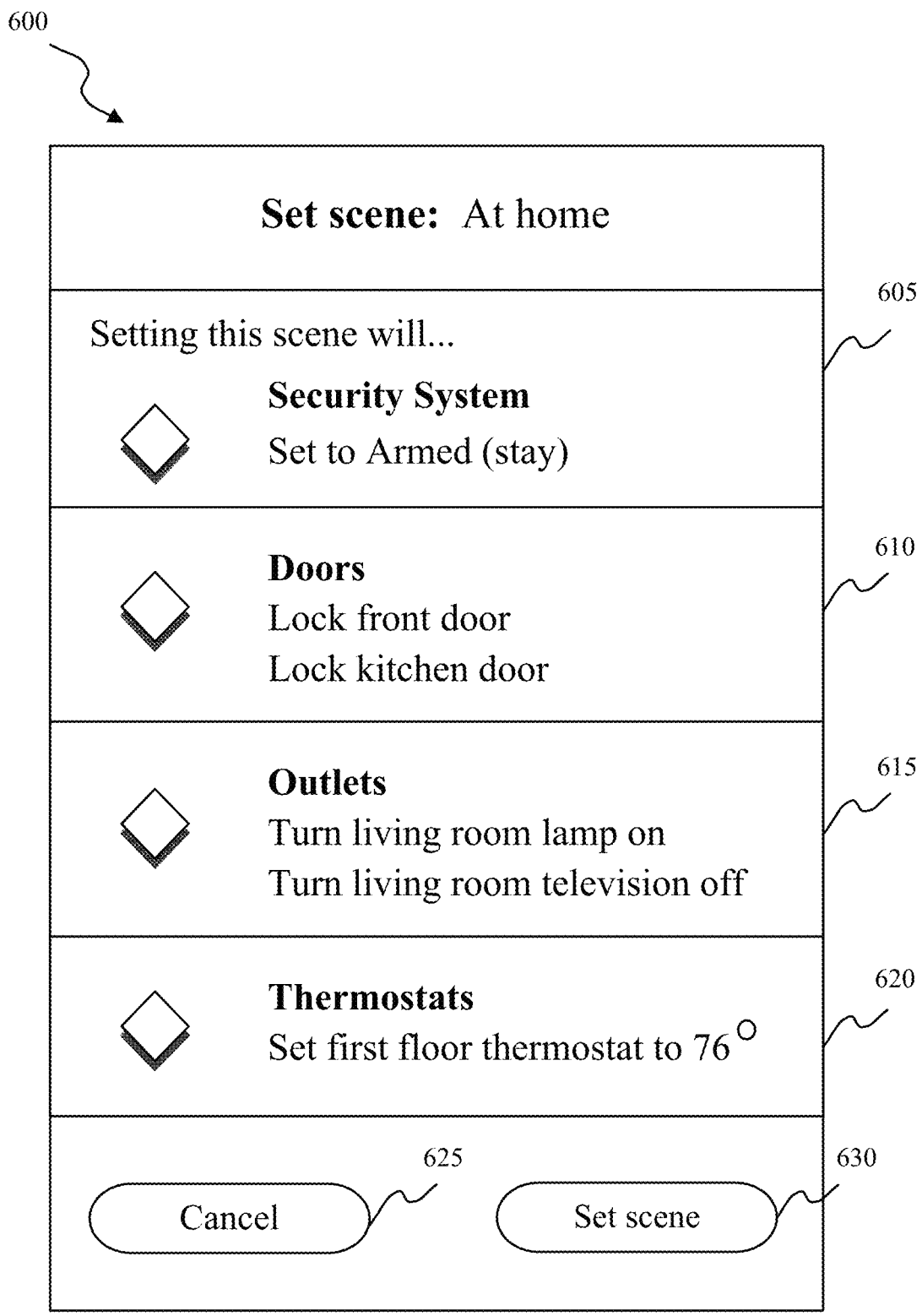
FIG. 6 is a block diagram of an exemplary user interface for setting a scene listed on the scene listing view of FIG. 3.

Referring now to FIG. 6, an exemplary user interface for displaying a set scene view 600 may be generated by the view engine 240 (see FIG. 2). In certain implementations, the event detection engine 245 will detect, for example, a triggering event for display of a non-interactive summary list of configured devices and device settings for a particular view 605, 610, 615, 620. For example, selection of a scene list item in the scene list display of FIG. 3 may trigger display of a set scene view containing the non-interactive summary list of configured devices and device settings for the selected view. The event processing engine 250 may communicate with one or more engines in the model layer to obtain the correct list of items. Additional buttons may be generated by the view engine, including, for example, a Cancel button 625 and/or a Set scene button 630. The Cancel button 625 may trigger the display of whatever parent view triggered the display of the set scene view. The Set scene button may display a prompt (not shown) requesting confirmation of intent to set the scene, which confirmation results in a scene activation event. The scene activation event may trigger the sending of the appropriate commands to each configured device or system such that one or more of the configured devices or systems are placed in the state designated by the scene configuration.

Figure 7:
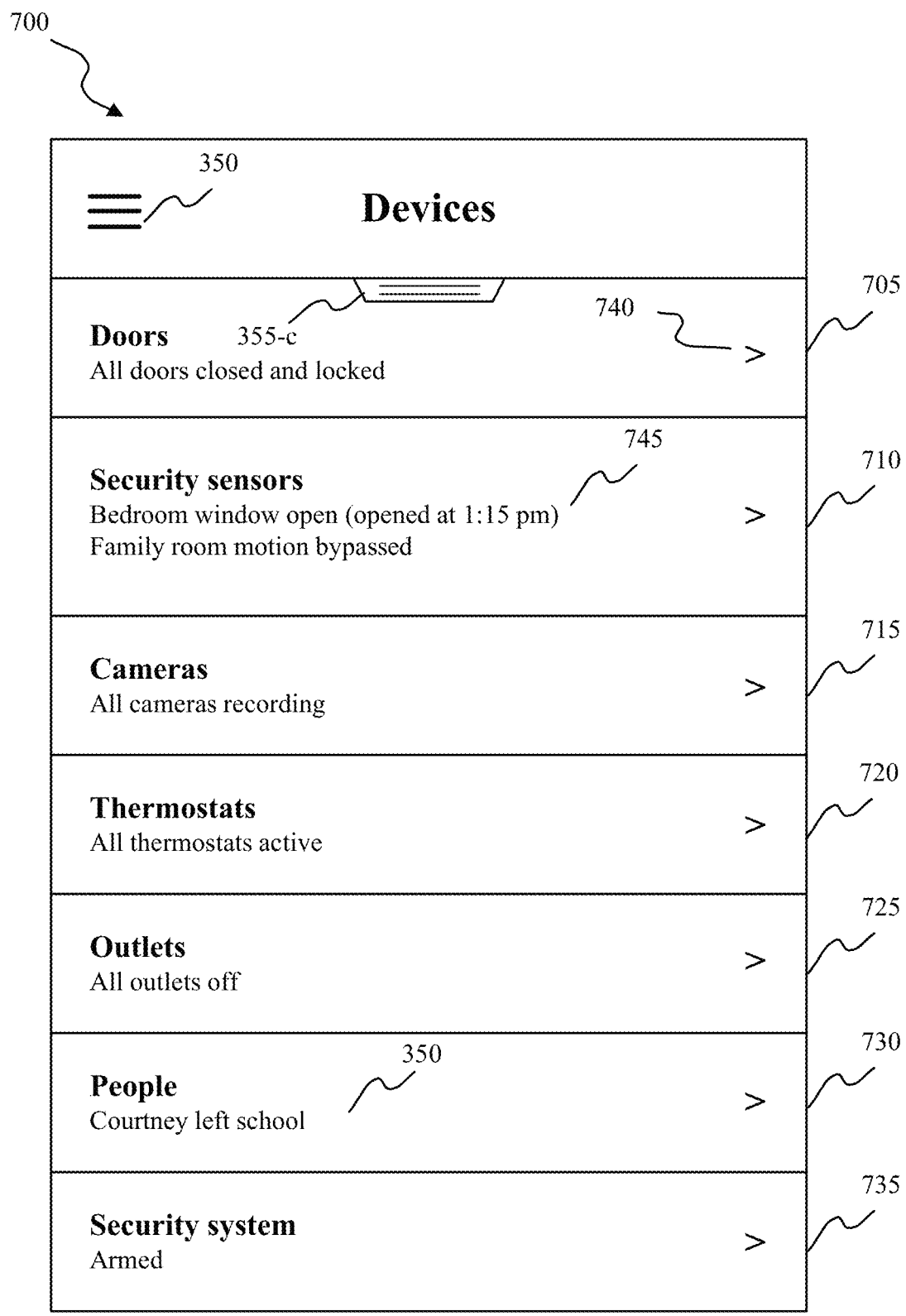
FIG. 7 is a block diagram of an exemplary user interface for a summary listing view displayed on a remote management device of FIG. 1.

Referring now to FIG. 7, an exemplary user interface for displaying a summary list of devices and/or system states, summary state view 700, may be generated by the view engine 240 (see FIG. 2). Each device and/or system state list item 705, 710, 715, 720, 725, 730, 735 may be displayed as a static element or an active control, with active controls indicated, for example, by a graphical indicator such as an arrow 740. Detection of a selection event for an active control by the event detection engine 245 may result in the event processing engine 250 generating a view with information or functionality relating to the device state list item. Such information or functionality may include, for example, device configuration functions, detailed device information, and the like. Each device state list item may include a device designator and/or device state data. In addition to device states associated with a single security device 710, list item categories may include, for example, device type states 705, 715, 720, 725, 730 and/or system states 735. A pullable view element may be provided and include a pull indicator 355-*c*.

In some embodiments, device type state list items may include an indication of a consistent state of all devices of a particular type. For example, a device type state list item configured to indicate the status of all camera devices 715 might indicate when all cameras are recording. Similarly, a device type state list item configured to indicate the status of all security devices 710 might indicate specific device states of one or more devices in the set of security devices where such devices are not in an expected state. For example, if the active scene is a standard vacation scene, a security sensors device type list item 710 may indicate when one or more window sensors report an open window and/or when one or more sensors have been bypassed. In some implementations, the last device event reported by a device is displayed 750 along with the time of the event 745. In other embodiments, where such devices are not in an expected state, the status indication may be a general indication rather than a specific device indication. For example, rather than indicate which doors are unlocked, the doors device type state list item may indicate generally that not all doors are locked.

Figure 8A:
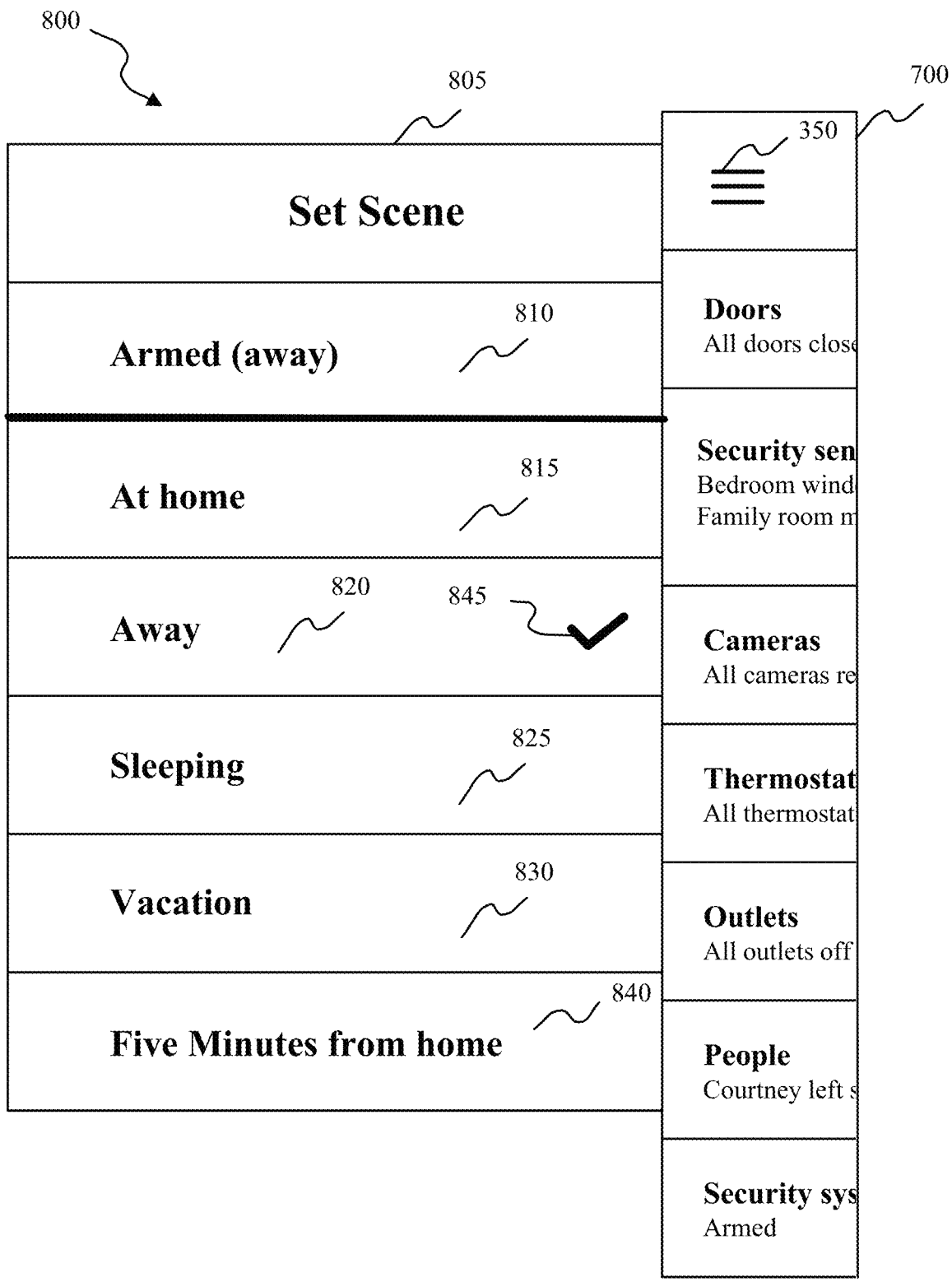
FIG. 8A is a block diagram of an exemplary user interface implementing a horizontal drawer control for accessing a set scene view from the main summary listing view of FIG. 7.

Referring now to FIG. 8A, an exemplary user interface 800 for displaying a set scene view in a horizontal drawer control may be generated by the view engine 240 (see FIG. 2). In some embodiments, a transitory user interface element 241 may be implemented using a drawer control. Drawer user interface controls (also referred to as nav drawers, fly-in menus, sliding menus, and hamburger menus) may be configured to hide content when a main view is active. Drawers are transient user interface elements that may provide functionality directly related to a specific context, such as a control, a detected environmental condition, or an application state. In some implementations, drawers are rendered not visible when a user completes an interaction event.

An example of a drawer user interface pattern for touch-screen devices may be described as a combination of a drawer menu view and a reveal/hide button and/or gesture, pattern in a manner where the main content slides out of the way to reveal the drawer in response to a button tap and/or selection event, a drag event, and/or detection of contextual event trigger. The drawer content may include meta-content intended for temporary access, such as, for example, navigation controls, and/or context-specific information and controls. In one embodiment, the drawer may be closed by tapping on and/or interacting with the partially-visible main content area. The drawer activation button, for example a hamburger menu control 350, may remain visible in the "navigation" header/footer immediately next to the side, on which, the drawer appears.

In some instances, a drawer may contain frequently accessed information, controls, or both that do not require persistent visibility. Drawers may be implemented such that they are accessed vertically from a top edge or bottom edge of a main view, horizontally from a side edge of a main view, or both. In some implementations, the drawer control may be implemented as a widget composed of two child views, namely a handle that a user drags and the content attached to the handle. In some embodiments, the drawer may be an overlay inside layouts, meaning they may be used inside of, for example, a FrameLayout or a RelativeLayout in an Android™ implementation. The drawer may be implemented using a property that maximizes the size of the drawer view such as, for example, the match_parent property for Android™. In the context of applications, in certain instances, a drawer may be a child window that slides out from a parent window configured to open or close while the parent window is open.

A set scene view 805 displayed in a drawer control may be accessible from one or more main views, such as a summary state view 700, of the application. In some embodiments, the set scene view 805 may include a nonselectable security system state indicator list item 810 and one or more selectable scene list items 815, 820, 825, 830, 840. In certain instances, the inclusion of one or more of the selectable scene list items may be determined, at least in part, by the detection of a current context by the context engine 235. For example, where the context engine determines the current user location context is representative of the user being 5 minutes away from home, the Five minutes from home selectable scene list item 840 may be included in the set scene view. Since the user is not at home, the Movie selectable scene list item may not be included in the set scene view. In some embodiments, standard scenes and/or currently active scenes may always be included in the set scene view. In other embodiments, standard scenes may be included in the set scene view based, at least in part, on their association with the configuration for the current context.

Figure 8B:
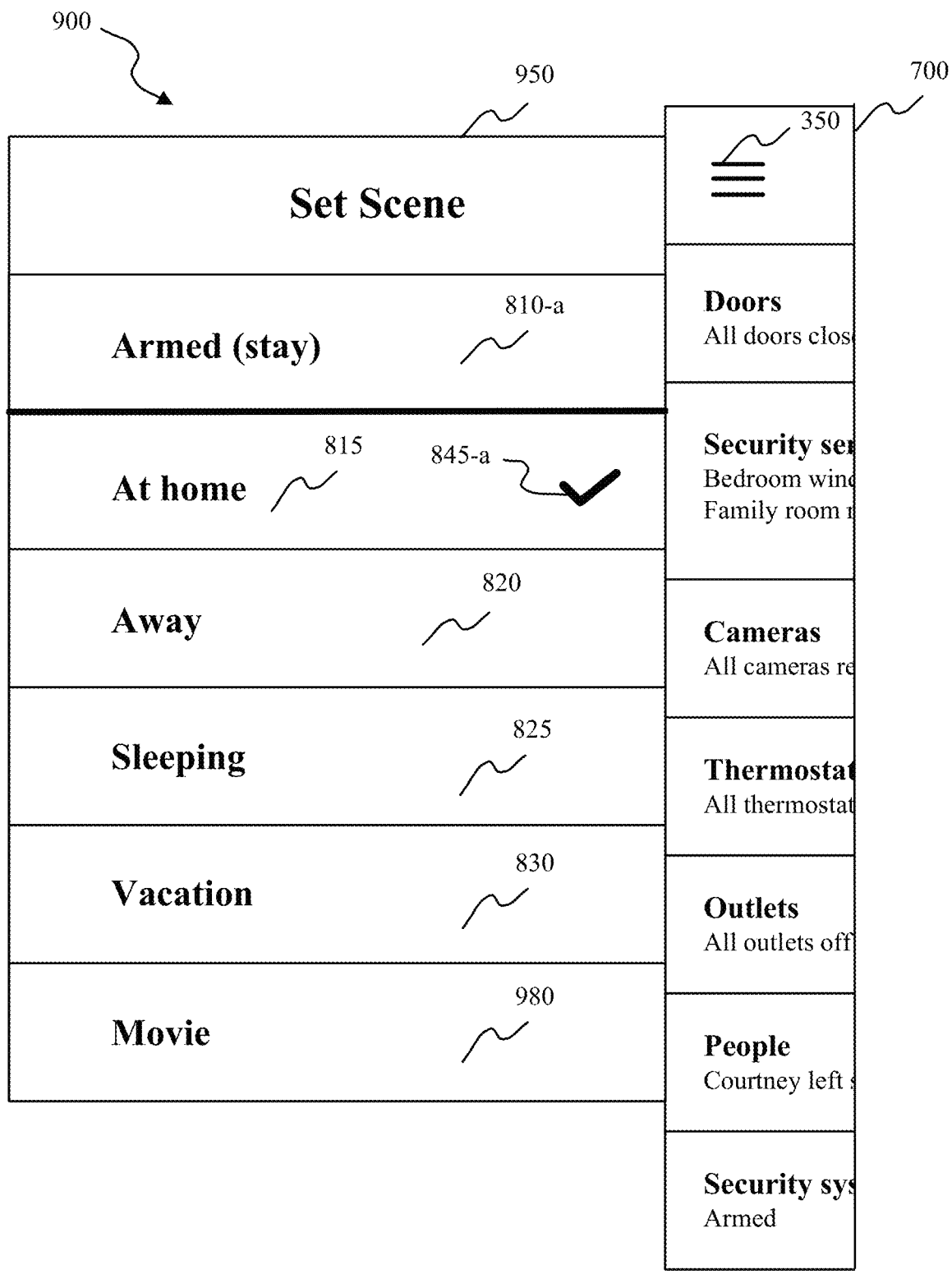
FIG. 8B is a block diagram of an exemplary user interface implementing a horizontal drawer control for accessing a set scene view from the main summary listing view of FIG. 7.

Referring now to FIG. 8B, an exemplary user interface 900 for displaying a set scene view 950. The set scene view 950 is displayed with a nonselectable security system state indicator list item 810-*a* and the At home scene indicated as currently-active using check mark 845-*a*. In this example, the context engine may determine a current application context where the At home scene is active. The Movie selectable scene list item 980 may be included in the set scene view based, at least in part, on the association of the Movie scene with the At home active scene application context. Since the user is at home, the Five minutes from home selectable scene list item may not be included in the set scene view based, at least in part, on the user location context.

Detection of a selection event for a selectable scene list item by the event detection engine 245 (see FIG. 2) may result in the event processing engine 250 activating the scene relating to the selectable scene list item. In some instances, a prompt (not shown) may be generated requesting confirmation of intent with scene activation conditioned on detection of a confirmation event. An indicator such as, for example, a check mark 845, may identify the currently-active scene. When the drawer control is visible, selection of a menu control, for example, a hamburger menu control 350 on the visible portion of the summary state view 700, may trigger the transition of the drawer control to a hidden state. In some of these embodiments, the transition is a visual simulation of a sliding window, with the drawer control disappearing "behind" the main view. On touch screen devices, a swipe gesture starting at or near the edge of the drawer control distal to the main view may also trigger the transition.

In some embodiments, other transient user interface controls may be implemented including, for example, sheet controls, popovers, and sidebar menus. A popover, for example, may float above a window that contains the control or area that it is related to, and its border may include an arrow (sometimes referred to as an anchor) that indicates the point from which it emerged. In some cases, users can detach a popover from its related element, which causes the popover to become a panel.

Figure 9:
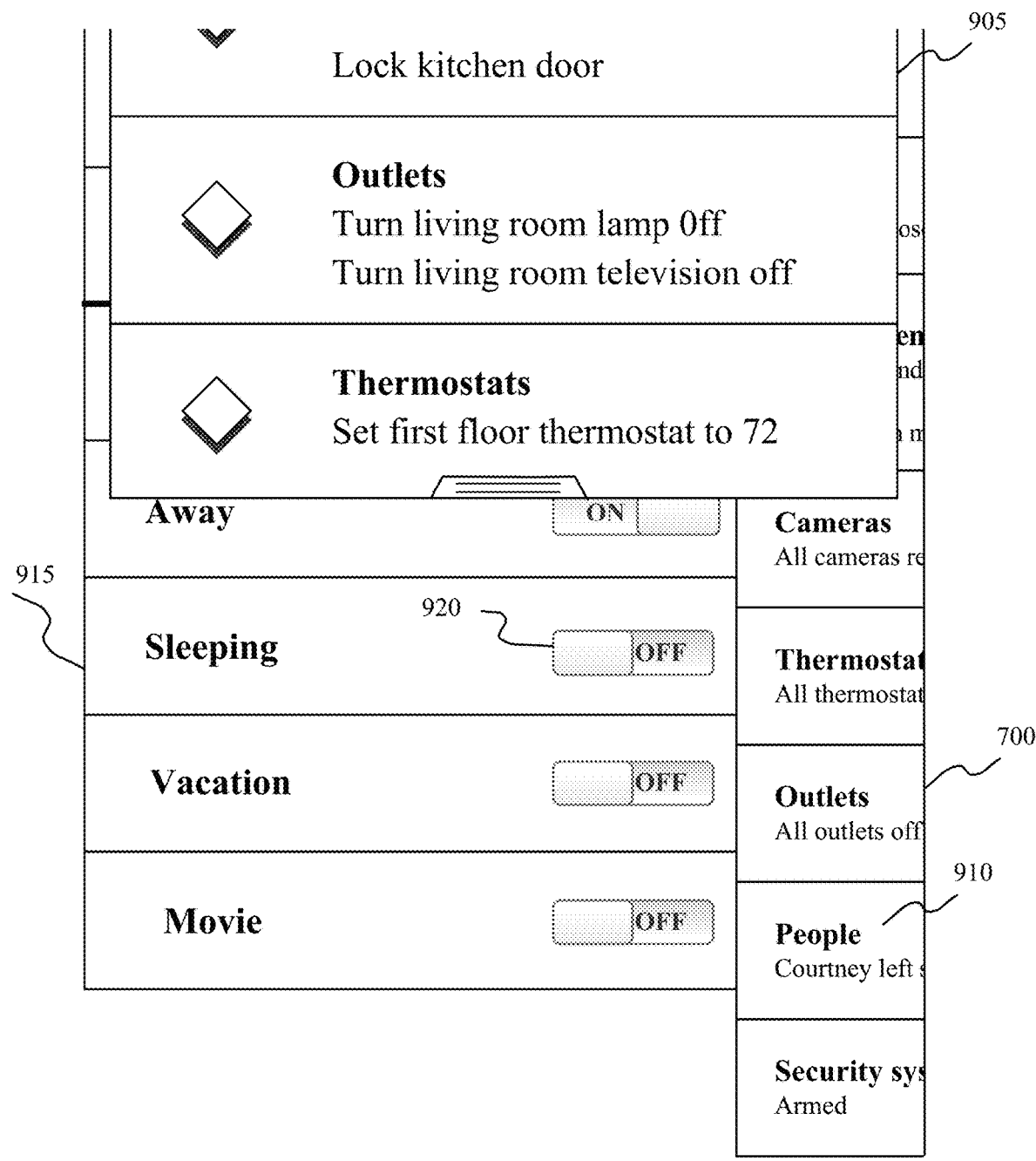
FIG. 9 is a block diagram of an exemplary user interface implementing layered horizontal and vertical transitory user interface controls displayed in combination for accessing the set scene view of FIG. 8A and FIG. 8B.

Referring now to FIG. 9, an exemplary user interface for displaying layered horizontal and vertical transitory user interface controls in combination may be generated by the view engine 240. In this example, the main view may be a summary state view 700. This list may include information relevant to decisions relating to setting an active scene. For example, the People list item 910 may indicate someone is at the property, which may impact decisions on whether a scene should be and/or can be activated. In some implementations, the set scene view 915 may be displayed in an always-available transitory user interface control, such as a horizontal drawer control. The selectable set scene view list items may include a scene activation control, such as, for example, a sliding switch 920. In some implementations, a single scene activation control may be set to an on position at any one time. A pullable view may be available containing a scene summary pullable view 905 for the selected scene list item in the set scene view list. The information in the scene summary view may impact decisions on whether the device and system settings for a particular scene are appropriate and/or desired. If no scene is selected, default content can populate the scene summary view, such as, for example, summary information relating to the currently active scene. Contextually-based display and control of scenes and scene-related content is just one example of contextually-driven transitory user interface controls. Other contextually and non-contextually relevant content and control views may be presented in transitory user interface controls.

Figure 10:
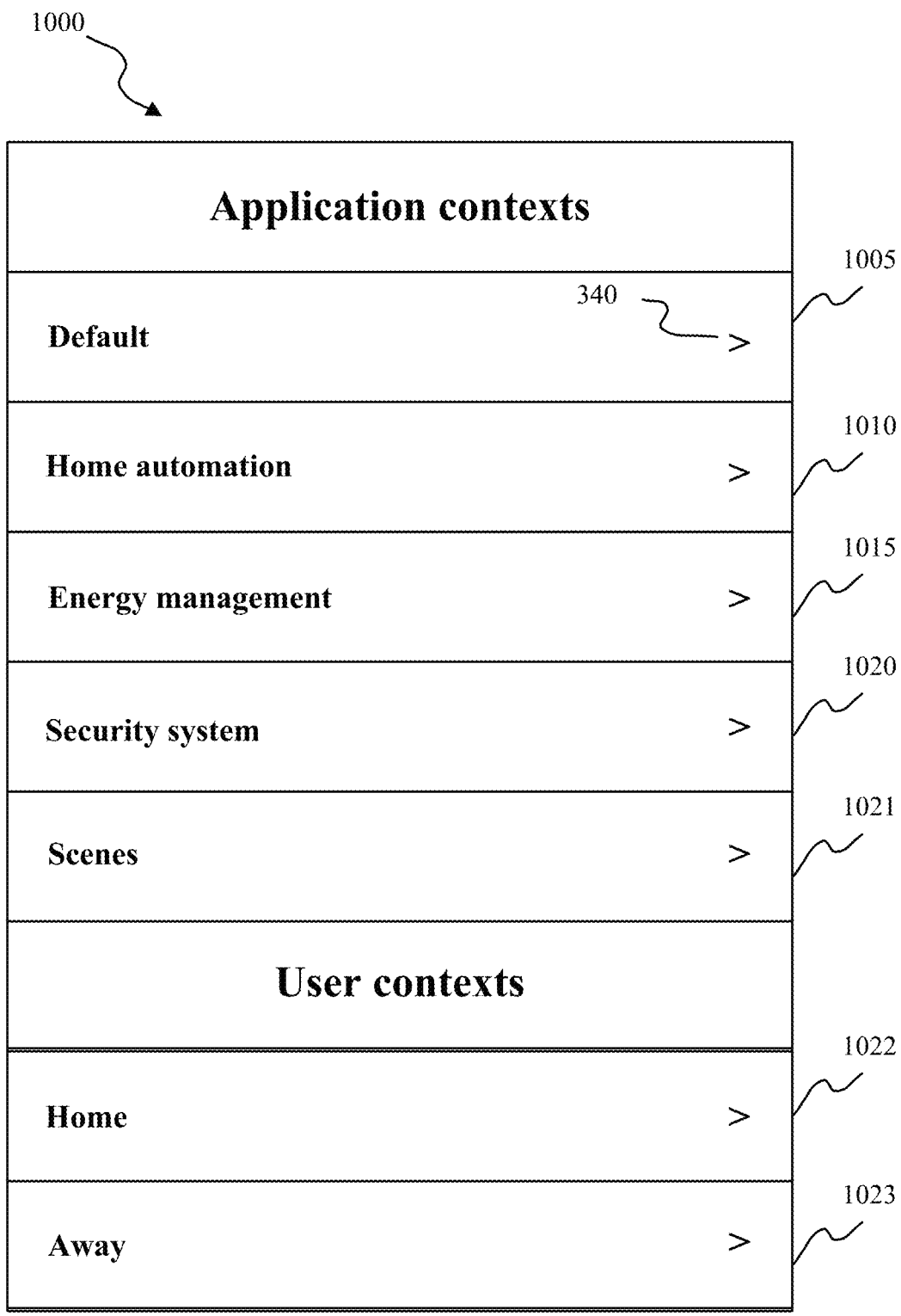
FIG. 10 is a block diagram of an exemplary user interface for a configurable context selections listing displayed on a remote management device of FIG. 1.

FIG. 10 is a block diagram of an exemplary user interface 1000 for a configurable context selections listing displayed on a remote management device. In some embodiments, contexts may be enabled, created, edited and/or configured to associate desired application behaviors with the detection of an associated context by the context engine 235 (see FIG. 2). Contexts may include a default context configuration 1005, a home automation context configuration 1010, an energy management context configuration 1015, a security system context configuration 1020, and a scenes context configuration 1021. For example, the security system context configuration 1020 may include one or more scenes to be displayed in a scene list view when a security system is in an armed state. In another example, the home automation context configuration 1010 may include a configuration option to display a warning when a door locking function is attempted while a sensor 125 indicates a door is in an open state, and/or alternatively to disable door locking functionality during this detection condition by the context engine 235. A scene context may associate one or more application behaviors to the detection of an activated scene. For example, the detection of a vacation scene may trigger the inclusion of one or more scenes to be displayed in a scene list view. In some embodiments, one or more context elements may not be configurable, but rather, programmatically determined at run time, hard-coded at compile time, and/or enabled according to installation rules at the time of system or device installation.

In some embodiments, application behaviors associated with user contexts are configurable. Detection of the location of a user in relation to a property by, for example, an embedded GPS component may be obtained by the location engine 236 (see FIG. 2) and passed to the context engine

235. The context engine may compare the location coordinates of the user to the location coordinates of the property to determine the distance the user is from the property. If that determination results in a value that exceeds a threshold distance, then the user context may be set to away 1023, resulting in the initiation of the application behaviors associated with the away context. For example, if user context is determined to be away 1023, the vacation scene selectable list item may be included in the scene list view. If the user context is determined to be home 1022, the movie scene selectable list item may be included in the scene list view.

In some embodiments, context configuration may be specific to a user. Referring again to FIG. 1, the context configuration may be stored in a persistent data store 131 on the remote management device 105, or in a remote data store such as, for example, a service provider database 120 or a data store on another system device such as home automation controller 155. The stored configuration may be associated with one or more user accounts and/or user credentials. In some embodiments, context configuration may be device specific, available only to users of the device where the context configuration is persistently stored.

Figure 11:
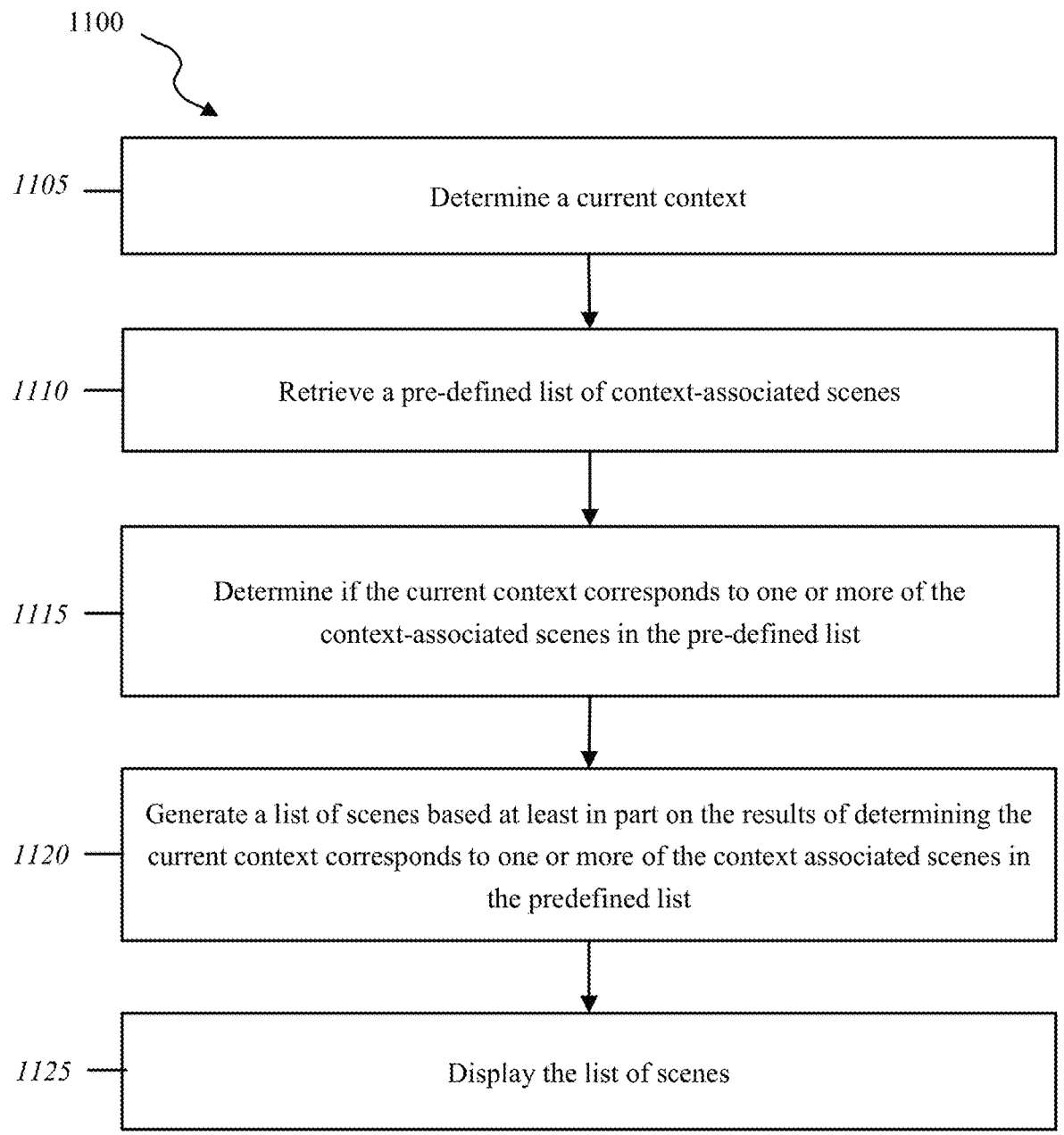
FIG. 11 is a flow diagram illustrating a method for displaying the scene listing view of FIG. 3 according to various embodiments.

Referring now to FIG. 11, a general method 1100 of using various embodiments of the systems and/or devices described herein is shown. For example, method 1100 may be implemented utilizing the various embodiments of environment 100, remote management device 105, location services 132, application 140, application 140-a, home automation controller 155, computing device 150, sensor 125, feature controller 126, and/or other devices and/or components.

At block 1105, in some embodiments, context engine 235 (see FIG. 2) determines a current context. Contexts may include, for example, an application context, user context, or both. Application contexts may include, for example, a default context, a scene context, a person-of-interest context, and/or a functional context. User contexts may include, for example, a location context such as at home and away from home.

At block 1110, one or more pre-defined lists of context-associated scenes may be retrieved from memory based, at least in part, on the result of the determining step of block 1105. In some embodiments, list retrieval is performed by data engine 230 (see FIG. 2). Memory may be a local integrated device memory, external connected memory, and/or a memory coupled to another computer device. The retrieved context configuration may be specific to a device, specific to a user, or both.

At block 1115, the context engine may compare each of the retrieved context-associated scenes with the current context, and determine if any context-associated scenes correspond to the current context. At block 1120, in some instances, if the results of the determining step of block 1120 indicates that one or more context-associated scenes corresponds to the current context, the application 140 will generate a list of scenes that may provide reference for scenes and/or scene information to be included in one or more user interface views. List generation may be based, at least in part, on the results of the determining step of block 1115. The parsing engine 220 (see FIG. 2) may pass the list of scenes to the view engine 240 to be used for populating list elements and/or scene related information of a presentation view. At block 1125, the application 140-a may display the list of items in a view generated by the view engine 240. In certain cases, the view will include a transitory user interface element, such as, for example, a drawer control or a pullable view control.

In some embodiments, the list of items may include one or more selectable scene items that activate the associated scene when a selection event is detected. In certain instances, the list of selectable items includes a selectable item associated with a security system, such as an arming control, and a selectable item associated with a property automation devices, such as door locking feature control.

Figure 12:
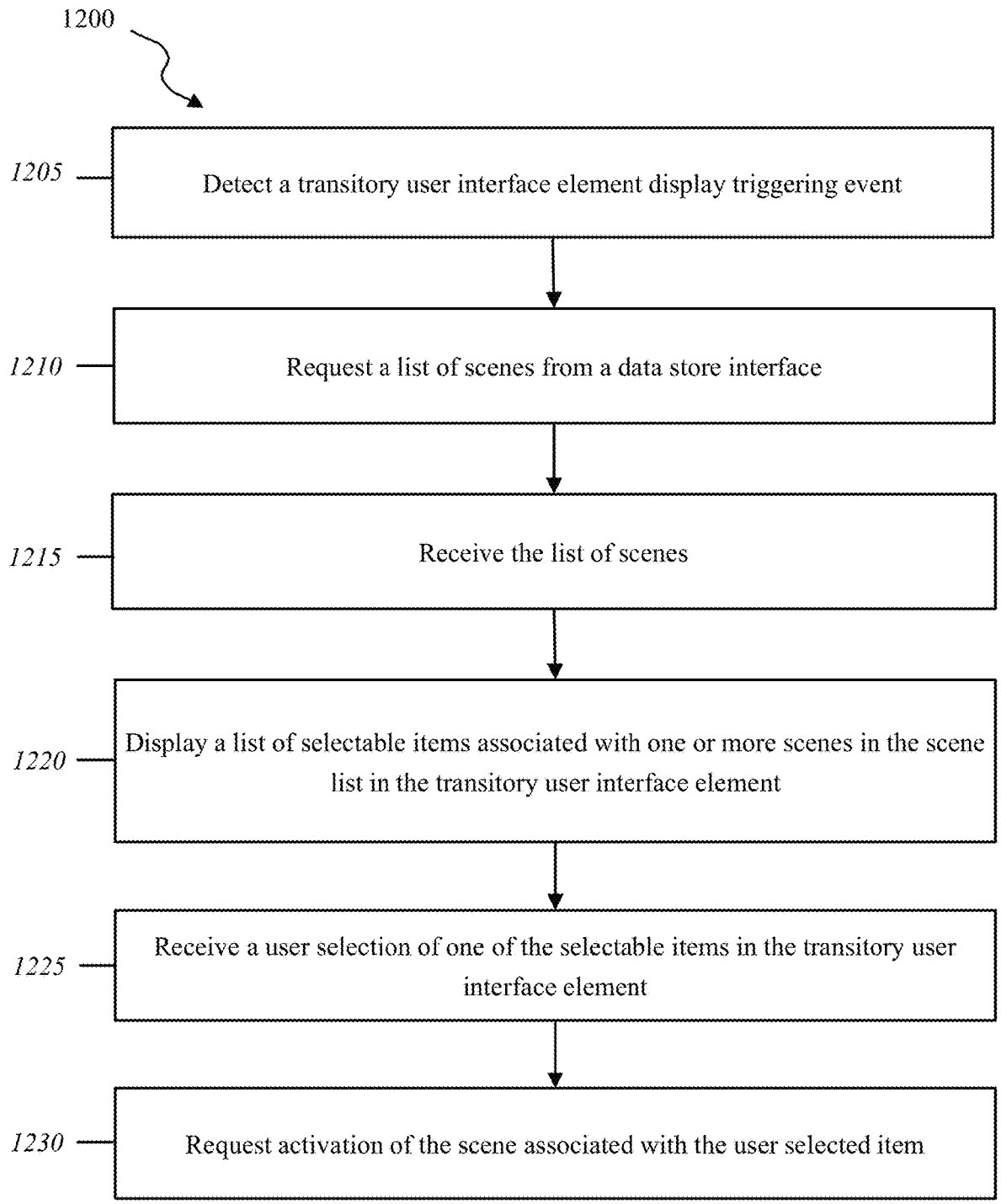
FIG. 12 is a flow diagram illustrating a method for setting a scene using a transitory user interface such as the drawer control interface of FIG. 8.

Referring now to FIG. 12, a general method 1200 of using various embodiments of the systems and/or devices described herein is shown. For example, method 1200 may be implemented utilizing the various embodiments of environment 100, remote management device 105, location services 132, application 140, application 140-a, home automation controller 155, computing device 150, sensor 125, feature controller 126, and/or other devices and/or components.

At block 1205, the event detection engine 245 detects a transitory user interface element display triggering event, such as, for example, the selection of a hamburger menu control. The event detection engine 245 directs the event processing engine 250 to initiate the appropriate processing activities, such as directing the coordination engine 255 to request the current context from the context engine 235, and/or directing the view engine 240 to generate the appropriate transitory user interface element.

At block 1210, scenes and scene related data stored in a data store 131 may be requested by the data engine 230 directly and/or through a data service interface such as, for example, a service provider device 110. The event processing engine 250 may initiate a request for a list of scenes by making a call to the data engine. At block 1215, the data engine may receive the list of scenes directly from the data store and/or through a data store interface. Further parsing of the data may be performed by the parsing engine 220 prior to returning information to the event processing engine 250.

At block 1220, the event processing engine 250 may pass the list of scenes to the view engine 240 to be used for populating a list of selectable scene items in a presentation view. In some instances, the presentation view may include a transitory user interface element 241 such as, for example, a drawer control. At block 1225, the presentation view may receive a user selection of a selectable scene item in the transitory user interface element 241. At block 1230, the event detection engine 245 may detect the selection of a selectable scene item and request activation of the associated scene. In some embodiments, scene activation consists of a single activation call to an external computing device such as a service provider device 110, a home automation controller 155, and/or a computing device 150. The external computing device may then process the activation request, send the appropriate commands, and/or receive the corresponding acknowledgments for scene activation.

Figure 13:
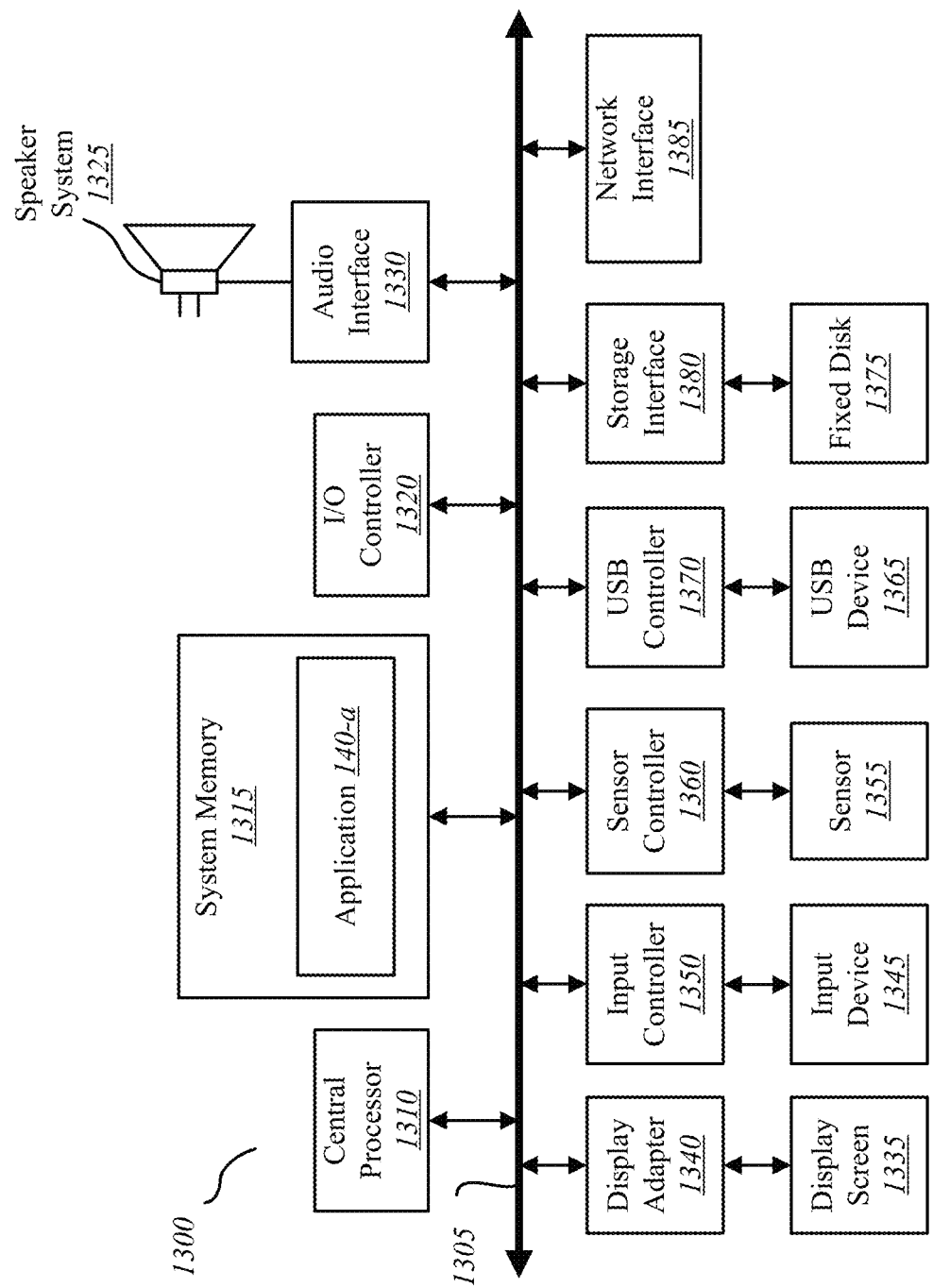
FIG. 13 is a block diagram of a computer system suitable for implementing the present systems and methods of FIG. 1.

FIG. 13 depicts a block diagram of a controller 1300 suitable for implementing the present systems and methods. The controller 1300 may be an example of remote management device 105, computing device 150, and/or home automation controller 155 illustrated in FIG. 1. In one configuration, controller 1300 includes a bus 1305 which interconnects major subsystems of controller 1300, such as a central processor 1310, a system memory 1315 (typically RAM, but which may also include ROM, flash RAM, or the like), an input/output controller 1320, an external audio device, such as a speaker system 1325 via an audio output interface 1330, an external device, such as a display screen 1335 via display adapter 1340, an input device 1345 (e.g., remote control device interfaced with an input controller 1350), multiple USB devices 1365 (interfaced with a USB controller 1370), and/or a storage interface 1380. Also included are at least one sensor 1355 connected to bus 1305 through a sensor controller 1360 and a network interface 1385 (coupled directly to bus 1305).

Bus 1305 allows data communication between central processor 1310 and system memory 1315, which may include read-only memory (ROM) or flash memory, and random access memory (RAM), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. Applications (e.g., application 140) resident with controller 1300 are generally stored on and accessed via a non-transitory computer readable medium, such as a hard disk drive (e.g., fixed disk 1375) or other storage medium. Additionally, applications may be in the form of electronic signals modulated in accordance with the application and data communication technology when accessed via network interface 1385.

Storage interface 1380, as with the other storage interfaces of controller 1300, may connect to a standard computer readable medium for storage and/or retrieval of information, such as a fixed disk 1375. Fixed disk 1375 may be a part of controller 1300 or may be separate and accessed through other interface systems. Network interface 1385 may provide a direct connection to a remote server via a direct network link to the Internet via a POP (point of presence). Network interface 1385 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1300 wirelessly via network interface 1385.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, and/or utility equipment monitor, and so on). Conversely, all of the devices shown in FIG. 13 need not be present to practice the present systems and methods. The devices and subsystems may be interconnected in different ways from that shown in FIG. 13. The aspect of some operations of a system such as that shown in FIG. 13 are readily known in the art and are not discussed in detail in this application. Computer instructions to implement the present disclosure may be stored in a non-transitory computer-readable medium such as one or more of system memory 1315 or fixed disk 1375. The operating system provided on controller 1300 may be, for example, iOS®, ANDROID®, MS-DOS®, MS-WINDOWS®, OS/2®, UNIX®, LINUX®, OSX®, or another known operating system.

In some embodiments, a Model-View-Controller design pattern implements the interactive behavioral treatment delivery system, assigning objects in the system to one of three roles: model, view, or controller. The pattern may define not only the roles objects play in the application, but may also define the way objects communicate with each other Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A graphical user interface for a home automation scene control system produced by an application program operating on a computing device having a display, a memory, and one or more processors to execute one or more programs stored in the memory, the graphical user interface comprising:
   a scene selection list comprising a plurality of selectable items to set a scene view wherein:
      one or more selectable items represent a scene;
      the scene selection list comprises a transitory user interface element to reveal or hide content based at least in part on a touch input from a user;
      the one or more selectable items are configured to activate a represented scene;
      a first selectable item is associated with one or more property automation device settings; and
      a second selectable item is associated with one or more security system device settings;
      wherein determination of inclusion of the first selectable item, the second selectable item, or both, in the scene selection list is based, at least in part, on user location information based at least in part on global positioning system coordinates to determine the user location;
      wherein the user location information comprises location coordinates, speed and direction data of the user to determine the user location and wherein the application program compares the user location information to location parameters associated with respective selectable items of the plurality of selectable items to modify the inclusion of the respective selectable items in the scene;
      wherein the application program detects a confirmation event from the user, the confirmation event activating a first scene from the scene selection list based at least in part on a touch input selecting a selectable item of the plurality of selectable items; and
      wherein the application program visually generates a prompt requesting confirmation of user intent corresponding to the activation of the first scene in the scene selection list.

2. The graphical user interface of claim 1, wherein the transitory user interface element is a drawer control.

3. The graphical user interface of claim 1, wherein the transitory user interface element is a pullable view control.

4. The graphical user interface of claim 1, further comprising a pullable view control at least accessible from the transitory user interface element, wherein a summary list is displayed in the pullable view control.

5. The graphical user interface of claim 1, wherein inclusion of one or more selectable items in the scene selection list is based, at least in part, on a current application context.

6. The graphical user interface of claim 1, wherein at least one selectable scene is associated with an energy management device setting.

7. The graphical user interface of claim 1, further comprising a scene summary view directly accessible from the transitory user interface element.

8. The graphical user interface of claim 1, wherein the computing device is a portable electronic device.

9. The graphical user interface of claim 1, wherein: at least one of the one or more selectable items is associated with a standard scene; and at least one of the one or more selectable items is associated with a custom scene.

10. A graphical user interface for a home automation scene control system produced by an application program operating on a computing device having a display, a memory, and one or more processors to execute one or more programs stored in the memory, the graphical user interface comprising:
    a scene selection list comprising a plurality of selectable items to set a scene view wherein:
       one or more selectable items represent a scene;
       the scene selection list comprises a transitory user interface element to reveal or hide content with a touch input from a user;
       a security activation state indicator is displayed coincident with the transitory user interface element;
       at least a portion of the scene selection list is displayed within an area defined by the transitory user interface element;
       one or more selectable items are configured to activate a represented scene; and
       at least one selectable item is associated with one or more property automation device settings;
       wherein determination of inclusion of the first selectable item, the second selectable item, or both, in the scene selection list is based, at least in part, on user location information based at least in part on global positioning system coordinates to determine the user location;
       wherein the user location information comprises location coordinates, speed and direction data of the user to determine the user location and wherein the application program compares the user location information to location parameters associated with respective selectable items of the plurality of selectable items to modify the inclusion of the respective selectable items in the scene;
       wherein the application program detects a confirmation event from the user, the confirmation event activating a first scene from the scene selection list based at least in part on a touch input selecting a selectable item of the plurality of selectable items; and
       wherein the application program visually generates a prompt requesting confirmation of user intent corresponding to the activation of the first scene in the scene selection list.

11. The graphical user interface of claim 10, wherein the transitory user interface element is a drawer control.

12. The graphical user interface of claim 10, wherein: at least one of the one or more selectable items is associated with a standard scene; and at least one of the one or more selectable items is associated with a custom scene.

* * * * *